US008494471B2

United States Patent
Takeuchi et al.

(10) Patent No.: US 8,494,471 B2
(45) Date of Patent: Jul. 23, 2013

(54) RECEIVER (75) Inventors: Mitsuru Takeuchi, Tokyo (JP); Eiji Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 96 days.

(21) Appl. No.: 13/139,812

(22) PCT Filed: Nov. 5, 2009

(86) PCT No.: PCT/JP2009/005878
§ 371 (c)(1),
(2), (4) Date: Jun. 15, 2011

(87) PCT Pub. No.: WO2010/097866
PCT Pub. Date: Sep. 2, 2010

(65) Prior Publication Data
US 2011/0244818 A1    Oct. 6, 2011

(30) Foreign Application Priority Data
Feb. 25, 2009 (JP) ................................ 2009-042617

(51) Int. Cl.
*H04B 1/10* (2006.01)
*H04K 1/10* (2006.01)
*H04B 1/30* (2006.01)

(52) U.S. Cl.
CPC ....................................... *H04B 1/30* (2013.01)
USPC ........... 455/296; 455/306; 455/307; 375/260; 375/348; 375/350

(58) Field of Classification Search
USPC .................. 455/296, 302, 306, 307; 370/260, 370/348, 350
See application file for complete search history.

(56) References Cited

U.S. PATENT DOCUMENTS

| 4,267,605 | A  | * | 5/1981  | Matsuzawa et al. | .......... 455/266 |
| 5,097,221 | A  | * | 3/1992  | Miller           | ........... 329/318 |
| 5,507,025 | A  | * | 4/1996  | Rodeffer         | ........... 455/266 |
| 6,181,740 | B1 |   | 1/2001  | Yasuda           |                    |
| 6,370,130 | B1 |   | 4/2002  | Zhou et al.      |                    |
| 7,058,141 | B1 | * | 6/2006  | Nedic            | ........... 375/341 |
| 7,133,471 | B2 | * | 11/2006 | Feher            | ........... 375/340 |
| 8,244,202 | B2 | * | 8/2012  | Kitayabu         | ........... 455/344 |
| 8,326,247 | B2 | * | 12/2012 | Takeuchi et al.  | ........... 455/131 |
| 2002/0051503 | A1 |   | 5/2002  | Takahiko         |                    |
| 2002/0081988 | A1 | * | 6/2002  | Parker           | ........... 455/296 |

(Continued)

FOREIGN PATENT DOCUMENTS

| JP | 10-163912 A | 6/1998 |
| JP | 10-341184 A | 12/1998 |

(Continued)

*Primary Examiner* — Duc M Nguyen
(74) *Attorney, Agent, or Firm* — Birch, Stewart, Kolasch & Birch, LLP (57) ABSTRACT

A receiver 1 is comprised of a first frequency changing circuit 13 for converting a received signal including two or more broadcast waves into a first intermediate frequency signal with a local oscillation, a band separation filter 14 consisting of a multistage FIR type filter for allowing bands included in the two or more broadcast waves converted into the above-mentioned first intermediate frequency signal to pass therethrough simultaneously, and a second frequency changing circuit 15 for converting the received signal which is outputted by the above-mentioned band separation filter 14 and which is limited to the above-mentioned two or more broadcast waves which the receiver desires to receive into a second intermediate frequency signal from which each of the broadcast waves can be sampled at a frequency at which the broadcast waves do not interfere with one another.

6 Claims, 12 Drawing Sheets

U.S. PATENT DOCUMENTS

2002/0173337 A1* 11/2002 Hajimiri et al. .............. 455/552
2008/0218256 A1* 9/2008 Cobb ........................... 327/555

FOREIGN PATENT DOCUMENTS

| | | |
|---|---|---|
| JP | 2001-103024 A | 4/2001 |
| JP | 2002-111528 A | 4/2002 |
| JP | 2003-309776 A | 10/2003 |
| JP | 2007-81878 A | 3/2007 |
| JP | 2007-312274 A | 11/2007 |
| WO | WO 2006/137324 A1 | 12/2006 |

* cited by examiner

RECEIVER

FIELD OF THE INVENTION

The present invention relates to a receiver capable of receiving multiple channels which simultaneously receives two or more broadcast waves.

BACKGROUND OF THE INVENTION

Many patent applications about a technology regarding a multichannel receiver that receives two or more broadcast waves simultaneously, for providing a receiver having a low-cost structure by sharing components among different models to reduce the component count have been applied.

For example, a multichannel receiver which has a frequency changing circuit for splitting one antenna input and then converting each broadcast wave which the multichannel receiver desires to receive into a signal having an intermediate frequency, and a band limiting filter, and which reduces its components, such as the antenna, by outputting one or more tuner outputs and performing signal demodulation on each of the one or more tuner outputs is known (for example, refer to patent reference 1).

Furthermore, a multichannel receiver which, in addition to the structure which the receiver disclosed by patent reference 1 has, has a structure of combining extracted broadcast waves, which the multichannel receiver desires to receive, again and then outputting a plurality of channels via one output terminal to be able to further reduce the hardware of a next-stage signal demodulating unit is also known (refer to patent reference 2).

RELATED ART DOCUMENT

Patent Reference

Patent reference 1: JP, 2003-309776,A
Patent reference 2: JP, 2007-81878,A

SUMMARY OF THE INVENTION

However, the receiver according to any one of the technologies disclosed by above-mentioned patent references 1 and 2 require local oscillators and band limiting filters corresponding to several channels which need demodulation. Therefore, this requirement is an obstacle to further downsizing and cost reduction required.

The present invention is made in order to solve the above-mentioned problem, and it is therefore an object of the present invention to provide a receiver that makes it possible to carry out multichannel reception and can implement further downsizing and cost reduction thereof.

In order to solve the above-mentioned problem, a receiver in accordance with the present invention includes: a first frequency changing circuit for converting a received signal including two or more broadcast waves into a first intermediate frequency signal with a local oscillation; a band separation filter consisting of a multistage FIR type filter for allowing bands included in the two or more broadcast waves converted into the above-mentioned first intermediate frequency signal to pass therethrough simultaneously; and a second frequency changing circuit for converting the received signal which is outputted by the above-mentioned band separation filter and which is limited to the above-mentioned two or more broadcast waves into a second intermediate frequency signal from which each of the broadcast waves can be sampled at a frequency at which the broadcast waves do not interfere with one another, and a delay time provided by delay circuits which construct the above-mentioned FIR type filter is a reciprocal of a frequency which is one-2nth (n is an arbitrary integer) of an entire channel band shown by a difference between a lowest channel of the above-mentioned received signal and a highest channel of the above-mentioned received signal.

Therefore, the receiver in accordance with the present invention makes it possible to carry out multichannel reception and can implement further downsizing and cost reduction thereof.

EMBODIMENTS OF THE INVENTION

Hereafter, in order to explain this invention in greater detail, the preferred embodiments of the present invention will be described with reference to the accompanying drawings.

Embodiment 1

Figure 1:
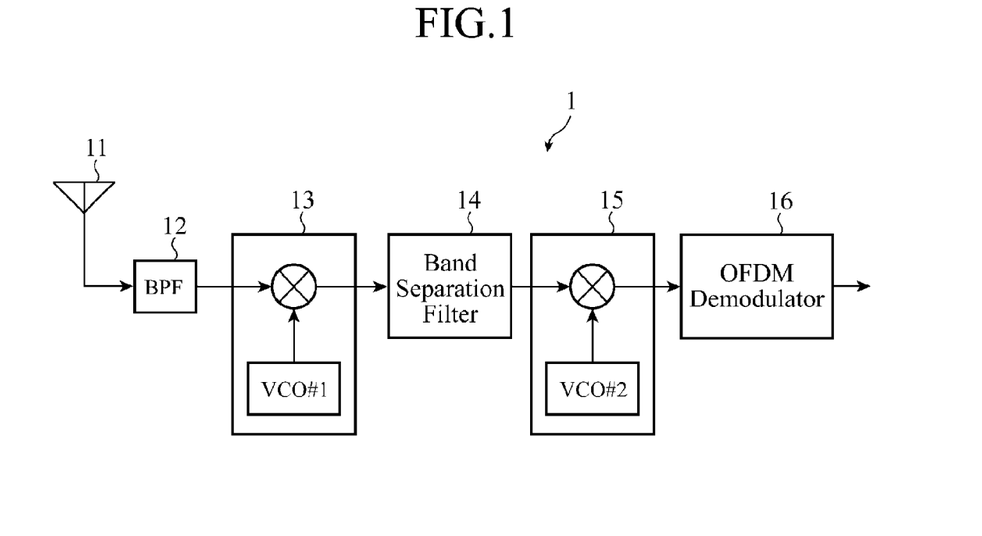
FIG. 1 is a block diagram showing the structure of a receiver in accordance with Embodiment 1 of the present invention.

FIG. 1 is a block diagram showing the structure of a receiver in accordance with Embodiment 1 of the present invention. As shown in FIG. 1, the receiver 1 in accordance with Embodiment 1 of the present invention is comprised of an antenna 11, a band limiting filter (BPF) 12, a first frequency changing circuit 13, a band separation filter 14, a second frequency changing circuit 15, and an OFDM (Orthogonal Frequency Division Multiplex) demodulator 16.

In this embodiment, only an LSI structure of a receiving system except the antenna 11 is shown, and an LSI structure of a playback system including a decoding circuit and a DA conversion circuit which are connected downstream from the OFDM demodulator 16 are not shown.

In the above-mentioned structure, a received signal inputted via the antenna 11 is limited to an entire broadcast wave band (for example, a UHF (Ultra High Frequency) band) by the BPF 12. The received signal limited by this BPF is mixed with a signal having a local frequency generated by a voltage controlled oscillator VCO (Voltage Controlled Oscillator) #1 which constructs the first frequency changing circuit 13, and is then converted into a signal having a first intermediate frequency. The received radio waves whose frequencies have been converted into intermediate frequencies by the first frequency changing circuit 13 are then inputted to the band separation filter 14.

Figure 2:
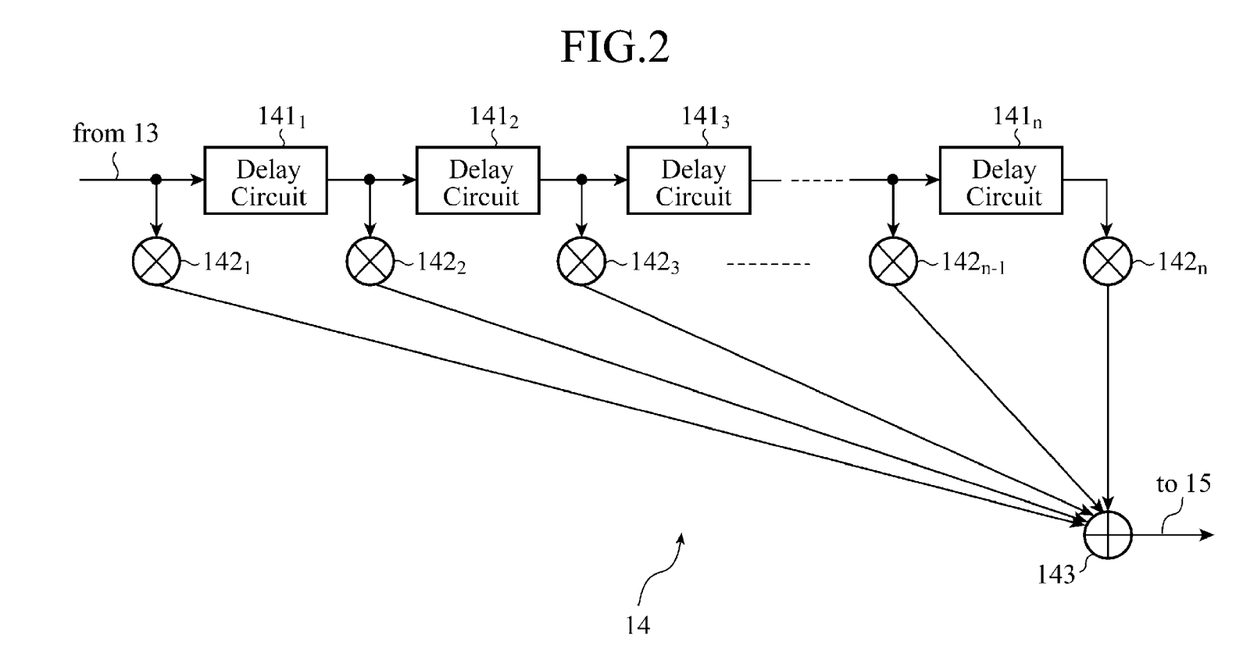
FIG. 2 is a view showing an equivalent circuit of a band separation filter which constructs the receiver in accordance with Embodiment 1 of the present invention.

The band separation filter 14 is comprised of, for example, an FIR (Finite Impulse Response) type transversal filter consisting of delay circuits $141_1$ to $141_n$, coefficient multiplying units $142_1$ to $142_n$, and an adder 143, as shown in FIG. 2.

As well known, the delay circuits $141_1$ to $141_n$ delay the received signal by a predetermined time, each of the coefficient multiplying units $142_1$ to $142_n$ multiplies an input or output of a corresponding one of the delay circuits $141_1$ to $141_n$ by a predetermined coefficient, and the adder 143 calculates the sum of the outputs of the coefficient multiplying units $142_1$ to $142_n$.

The delay time provided by the delay circuits $141_1$ to $141_n$ determines the loopback characteristic of the FIR type transversal filter which constructs the band separation filter 14. More specifically, a filter characteristic repeats at frequency intervals each having a frequency equal to the reciprocal of a minimum of the delay time provided by the delay circuits $141_1$ to $141_n$. Hereafter, it is assumed that band control is carries out by using this loopback characteristic.

Figure 3:
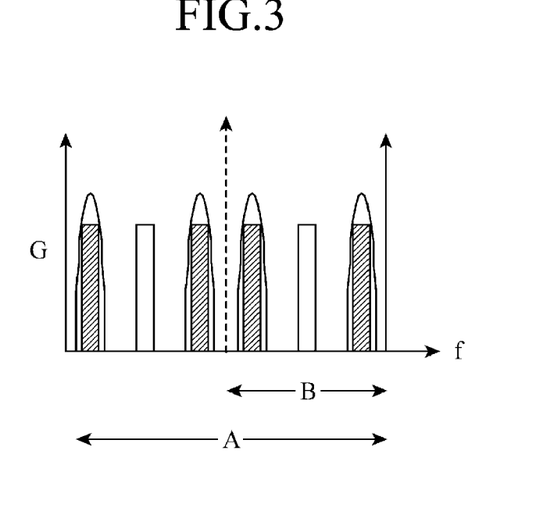
FIG. 3 is a view showing an example of the frequency characteristic of the band separation filter which constructs the receiver in accordance with Embodiment 1 of the present invention.

In the frequency characteristic shown in FIG. 3, a region denoted by a letter A shows an entire channel band, and a region denoted by a letter B shows a repeated band.

Referring to FIG. 1 again, the received radio waves which are limited only to the plurality of broadcast waves which the receiver desires to receive by the band separation filter 14 are outputted to the second frequency changing circuit 15, and are converted into a signal having an intermediate frequency which can be sampled at a proper sampling frequency at which the plurality of broadcast waves do not interfere with one another by a VCO #2 which constructs the second frequency changing circuit 15, and the intermediate frequency signal is outputted to the OFDM demodulator 16.

After performing frequency-axis conversion on the frequency band about all the broadcast wave bands which the receiver desires to receive by using an identical FFT (Fast Fourier Transform) unit, the OFDM demodulator 16 decomposes the intermediate frequency signal into the plurality of broadcast waves, and then converts each broadcast wave into an MPEG2-TS (Moving Picture Element Group 2-Transport Stream) and outputs this MPEG2-TS to a playback system including a not-shown decoding circuit.

Figure 4:
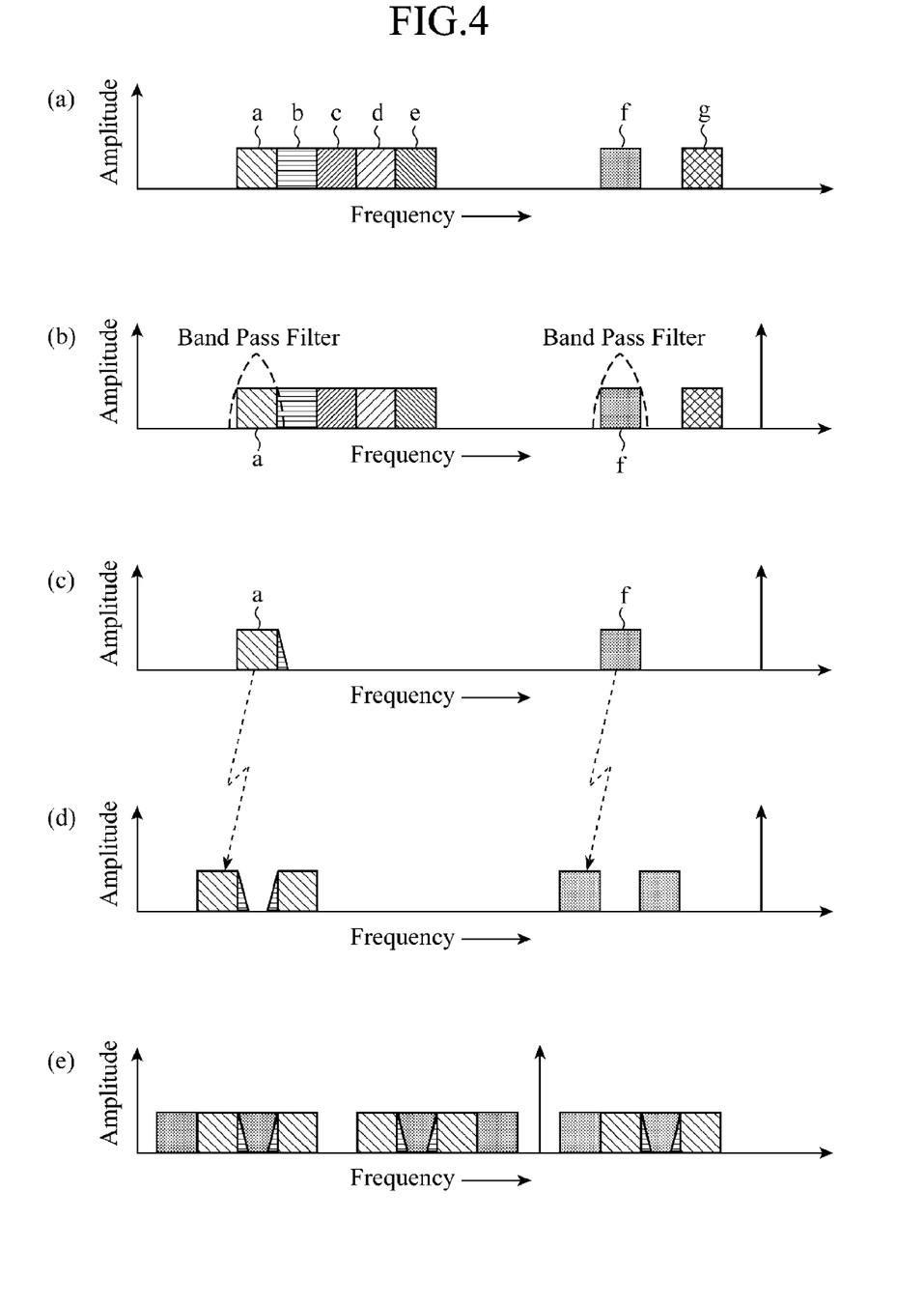
FIG. 4 is an operation conceptual diagram showing the operation of the receiver in accordance with Embodiment 1 of the present invention on the frequency characteristic view.

FIG. 4 is a view showing the frequency conversion carried out by the receiver 1 in accordance with Embodiment 1 of the present invention, and FIG. 4(a) shows the output of the BPF 12, FIG. 4(b) shows the output of the first frequency changing circuit 13, FIG. 4(c) shows the output of the band separation filter 14, FIG. 4(d) shows the output of the second frequency changing circuit 15, and FIG. 4(e) shows the output of an A/D converter which is a front stage constructing the OFDM demodulator 16.

Hereafter, the operation of the above-mentioned receiver 1 will be explained with reference to FIG. 4. First, the received signal inputted to the antenna 11 is furnished to the BPF 12, and is limited to broadcast waves in the entire broadcast wave band by the BPF 12. Hereafter, it is assumed that seven broadcast waves a to g are extracted, as shown in FIG. 4(a).

Then, the first frequency changing circuit 13 can convert the received signal into a signal having a proper intermediate frequency signal including all the broadcast waves which the receiver desires to receive by setting the local oscillating frequency fx of the VCO #1 to ½ (f1+f2+fy), where the frequency of the highest frequency one of the broadcast waves is f1, the frequency of the lowest frequency one of the broadcast waves is f2 and an offset frequency is expressed as fy.

The received radio waves whose frequencies have been converted into first intermediate frequencies by the first frequency changing circuit 13 are inputted to the band separation filter 14, and, as shown in FIG. 4(b), when the band separation filter 14 limits its pass band in such a way that, for example, the two broadcast waves a and f, which the receiver desires to receive via multiple channels, can pass therethrough simultaneously to block the passage of the other broadcast waves, the frequency characteristic varies as shown in FIG. 4(c).

The received signal which is band-limited into the two broadcast waves by the band separation filter 14 is furnished to the second frequency changing circuit 15 and is subjected to further frequency conversion by the second frequency changing circuit 15, so that a frequency characteristic as shown in FIG. 4(d) is acquired. When the received signal is then sampled by the A/D converter which is an input stage constructing the OFDM demodulator 16, a frequency characteristic as shown in FIG. 4(e) is acquired.

The OFDM demodulator 16 separates the two broadcast waves which the receiver desires to receive via multiple channels from this received signal. Assuming that the OFDM demodulator extracts the one having a lower frequency of the two broadcast waves first, the local oscillating frequency of the VCO #2 of the second frequency changing circuit 15 needs to be selected in such a way that looped-back waves do not coincide their original waves after the A/D converter and the sampling frequency can be lowered, as shown in FIGS. 4(d) and 4(e).

Because the receiver 1 in accordance with above-mentioned Embodiment 1 is comprised of the first frequency changing circuit 13 for converting a received signal including two or more broadcast waves into a first intermediate frequency signal with a local oscillation, the band separation filter 14 consisting of a multistage FIR type filter for allowing bands included in the two or more broadcast waves converted into the above-mentioned first intermediate frequency signal to pass therethrough simultaneously, and the second frequency changing circuit 15 for converting the received signal which is outputted by the band separation filter 14 and which is limited to the two or more broadcast waves into a second intermediate frequency signal from which each of the broadcast waves can be sampled at a frequency at which the broadcast waves do not interfere with one another, the structural components including the OFDM demodulator 16 of the receiver can be shared while the broadcast waves of two or more channels can be received simultaneously. Therefore, the hardware amount of the receiver can be reduced and the receiver can be easily formed into an LSI circuit.

Furthermore, in the receiver 1 in accordance with Embodiment 1, because the band separation filter 14 consists of the FIR type filter comprised of the multistage delay circuits $141_1$ to $141_n$, the coefficient multiplying units $142_1$ to $142_n$, and the adder 143, the band separation can be easily implemented only by changing the filter coefficients, and the filter can be easily designed in such away as to have a desired characteristic, such as the above-mentioned repetition characteristic or a linear phase characteristic. Furthermore, because the delay circuits $141_1$ to $141_n$, the coefficient multiplying units $142_1$ to $142_n$, and the adder 143 which construct the band separation filter 14 can be easily implemented by analog circuits, the band separation filter can be easily formed into an LSI circuit.

Because the receiver can easily carry out demodulation and reproduction of a plurality of broadcast waves by using the single OFDM demodulator 16, the receiver makes it possible to carry out multichannel reception with a small component count, and can implement further downsizing and cost reduction thereof.

In addition, by setting the delay time provided by the delay circuits $141_1$ to $141_n$ to be equal to the reciprocal of a frequency which is one-2nth of the entire channel band, and extracting the broadcast waves of a plurality of channels which the receiver desires to receive to prevent the reception of the broadcast waves of the other channels, the receiver can extract the broadcast waves of the plurality of channels by using the single FIR type filter.

Figure 5:
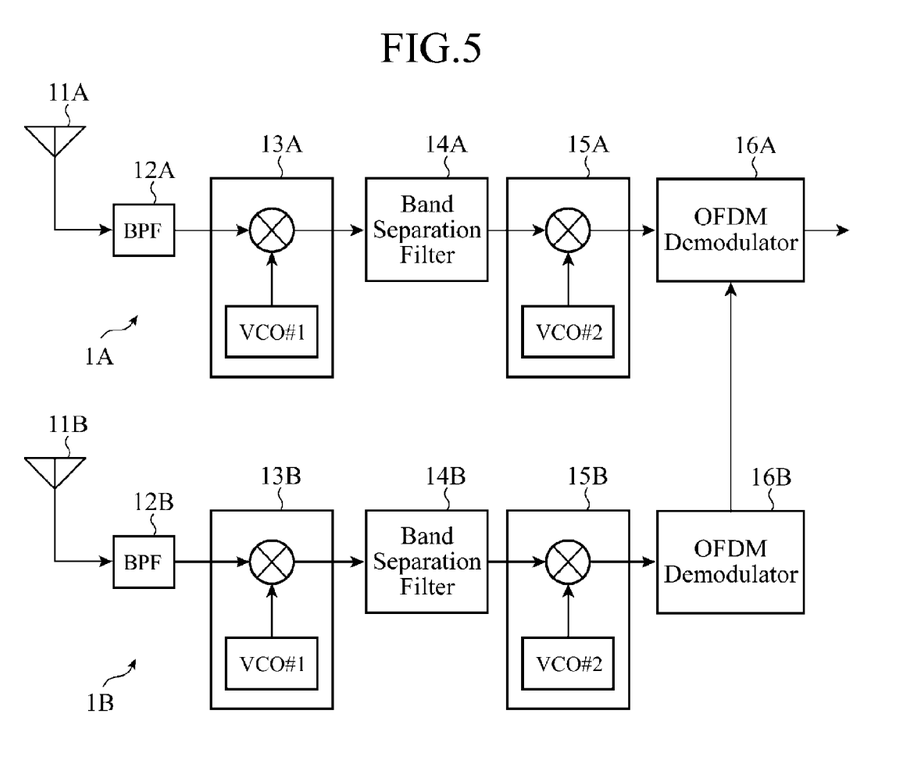
FIG. 5 is a block diagram in a case in which an n-branch diversity receiver is constructed by using a plurality of receivers in accordance with Embodiment 1 of the present invention.

By using two or more receives each having the above-mentioned structure, an n-branch diversity receiver as shown in, for example, FIG. 5, for combining two or more radio waves which the diversity receiver desires to receive or switching between them to take measures against fading can be constructed.

The above-mentioned n-branch diversity receiver has two receivers: a receiver 1A comprised of an antenna 11A, a BPF 12A, a first frequency changing circuit 13A, a band separation filter 14A, a second frequency changing circuit 15A and an OFDM demodulator 16A, and a receiver 1B comprised of an antenna 11B, a BPF 12B, a first frequency changing circuit 13B, a band separation filter 14B, a second frequency changing circuit 15B and an OFDM demodulator 16B, and the OFDM demodulator 16A captures the output of the OFDM demodulator 16B to combine the output thereof with the output of the OFDM demodulator 16B or switches between the output thereof and the output of the OFDM demodulator 16B to carry out the above-mentioned diversity reception.

The above-mentioned n-branch diversity receiver has an n (n is an arbitrary positive integer) receiving systems each comprised of the first frequency changing circuit 13, the band separation filter 14, and the second frequency changing circuit 15, and carries out n-branch diversity reception to combine or switch between two or more radio waves which the diversity receiver is going to receive. Therefore, the n-branch diversity receiver can implement multichannel reception while maintaining the diversity effect of taking measures against fading.

Embodiment 2

Figure 6:
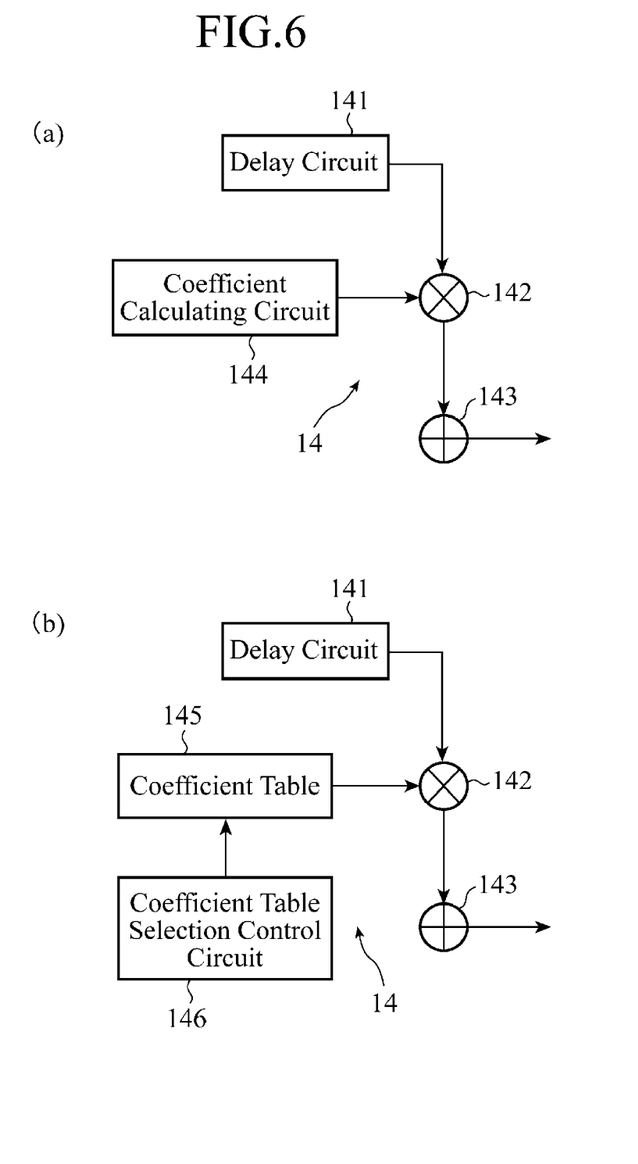
FIG. 6 is a block diagram showing the structure of a band separation filter for use in a receiver in accordance with Embodiment 2 of the present invention.
Figure 7:
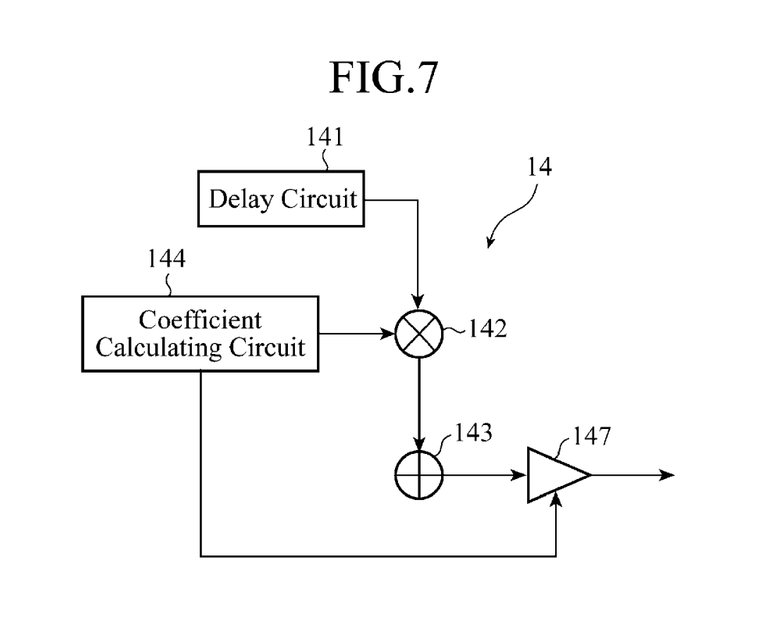
FIG. 7 is a block diagram showing a variant of the band separation filter for use in the receiver in accordance with Embodiment 2 of present invention.

FIGS. 6 and 7 are block diagrams showing the structure of a band separation filter 14 for use in a receiver 1 in accordance with Embodiment 2 of the present invention. In this embodiment, only a coefficient generating unit of an FIR type filter shown as Embodiment 1 in FIG. 2 is extracted and shown.

In FIGS. 6 and 7, because a part of delay circuits $141_1$ to $141_n$ and a part of coefficient multiplying units $142_1$ to $142_n$ have the same structure as those shown in FIG. 2, respectively, and the parts are not shown.

The coefficient generating unit of the FIR type filter which constructs the band separation filter 14 calculates coefficients by using an arithmetic operation of a coefficient calculating circuit 144, as shown in FIG. 6(a). As an alternative, as shown in FIG. 6(b), the coefficient generating unit of the FIR type filter which constructs the band separation filter 14 is comprised of a coefficient table 145 in which combinations of some coefficients are stored in advance, and a coefficient table selection control circuit 196 for selecting a combination of coefficients stored in the coefficient table 145.

The receiver 1 in accordance with above-mentioned Embodiment 2 can select optimal values of the coefficients of the coefficient multiplying units $142_1$ to $142_n$ which construct the FIR type filter by referring to the coefficient table 145 in which combinations of some coefficients are stored in advance or by selecting the values acquired through the arithmetic operation of the coefficient calculating circuit 144. In the case of selecting a combination of coefficients form the table, the circuit scale can be reduced because the coefficient calculating circuit 144 can be eliminated.

As shown in FIG. 7, by adding an output gain circuit 147 for adjusting its gain to control the level of the output of the FIR type filter according to the combination of coefficients to the output of the FIR type filter, degradation of the gain based on a change in the output level due to the characteristics of the selected filter can be compensated.

Furthermore, each of the adder 143 and the output gain circuit 147, among the above-mentioned structural components, can consist of a passive element.

Embodiment 3

Figure 8:
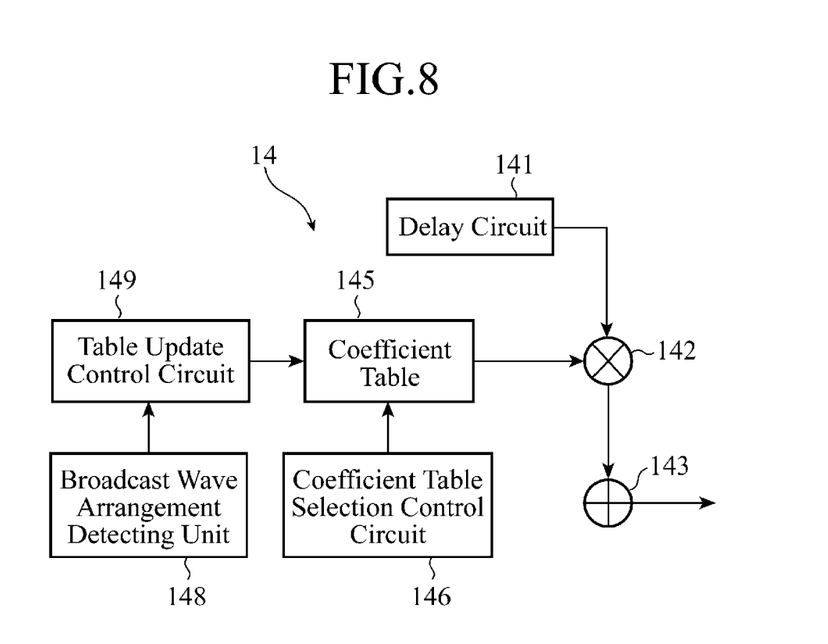
FIG. 8 is a block diagram showing the structure of a band separation filter for use in a receiver in accordance with Embodiment 3 of the present invention.

FIG. 8 is a block diagram showing the structure of a band separation filter for use in a receiver in accordance with Embodiment 3 of the present invention. The band separation filter in accordance with Embodiment 3 has a structure of including a broadcast wave arrangement detecting unit 148 and a table update control unit 149 in addition to the structure in accordance with Embodiment 2 shown in FIG. 6(b).

The broadcast wave arrangement detecting unit 148 detects a broadcast wave arrangement, and the table update control unit 149 calculates a filter characteristic according to the broadcast wave arrangement detected by the broadcast wave arrangement detecting unit 148 and generates new FIR filter coefficients to update table data stored in a coefficient table 145.

Figure 9:
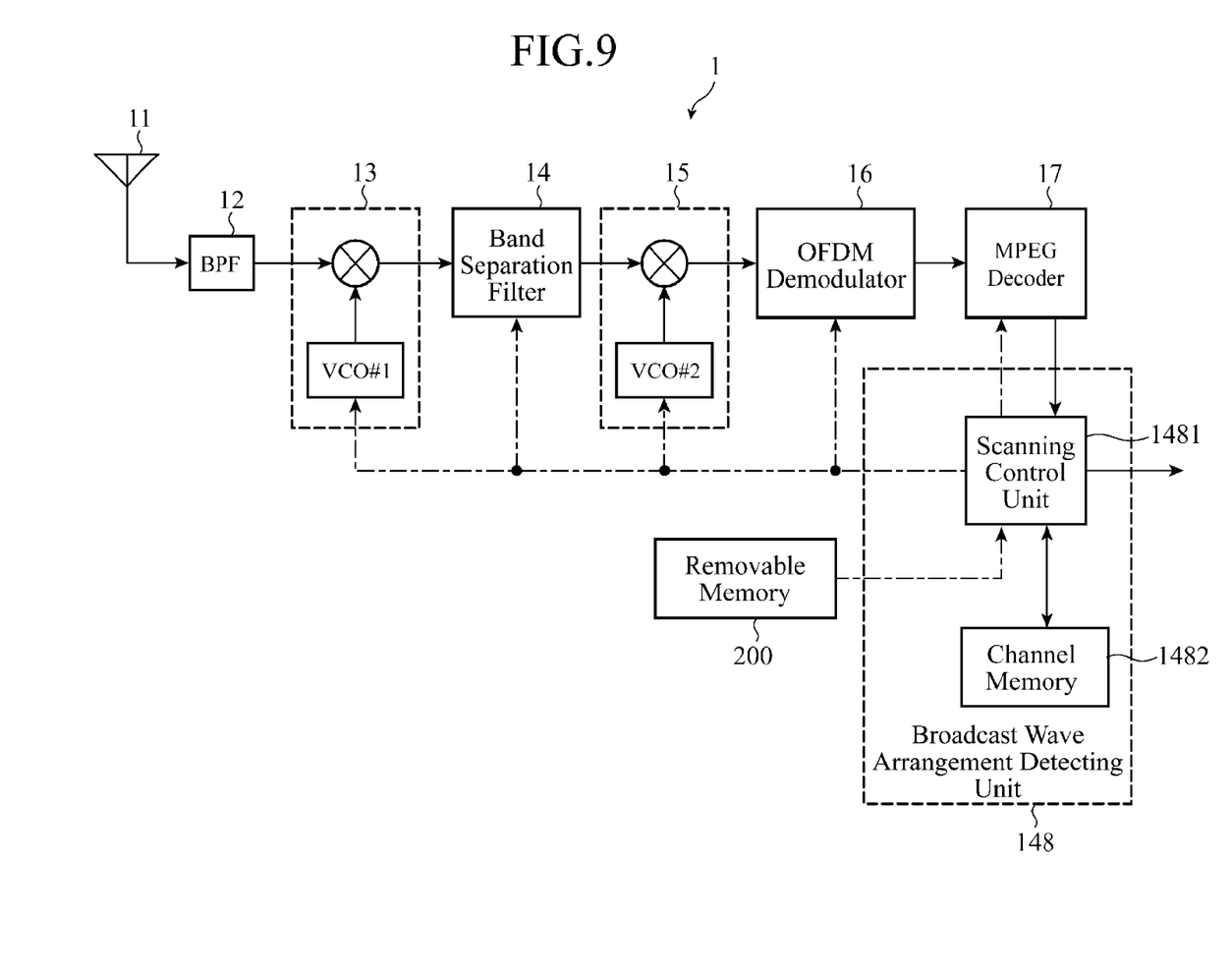
FIG. 9 is a block diagram showing a connection relation between the structure of a broadcast wave arrangement detecting unit for use in the receiver in accordance with Embodiment 3 of the present invention, and other structural components.

It is assumed that the broadcast wave arrangement detecting unit 148 uses a method of carrying out normal channel scanning, and updating the broadcast wave arrangement which the broadcast wave arrangement detecting unit stores currently by comparing the broadcast wave arrangement with the results of the normal channel scanning. More specifically, as shown in FIG. 9, the broadcast wave arrangement detecting unit 148 consists of a scanning control unit 1481 and a channel memory 1482, and updates the broadcast wave arrangement according to a procedure shown in FIG. 10.

Figure 10:
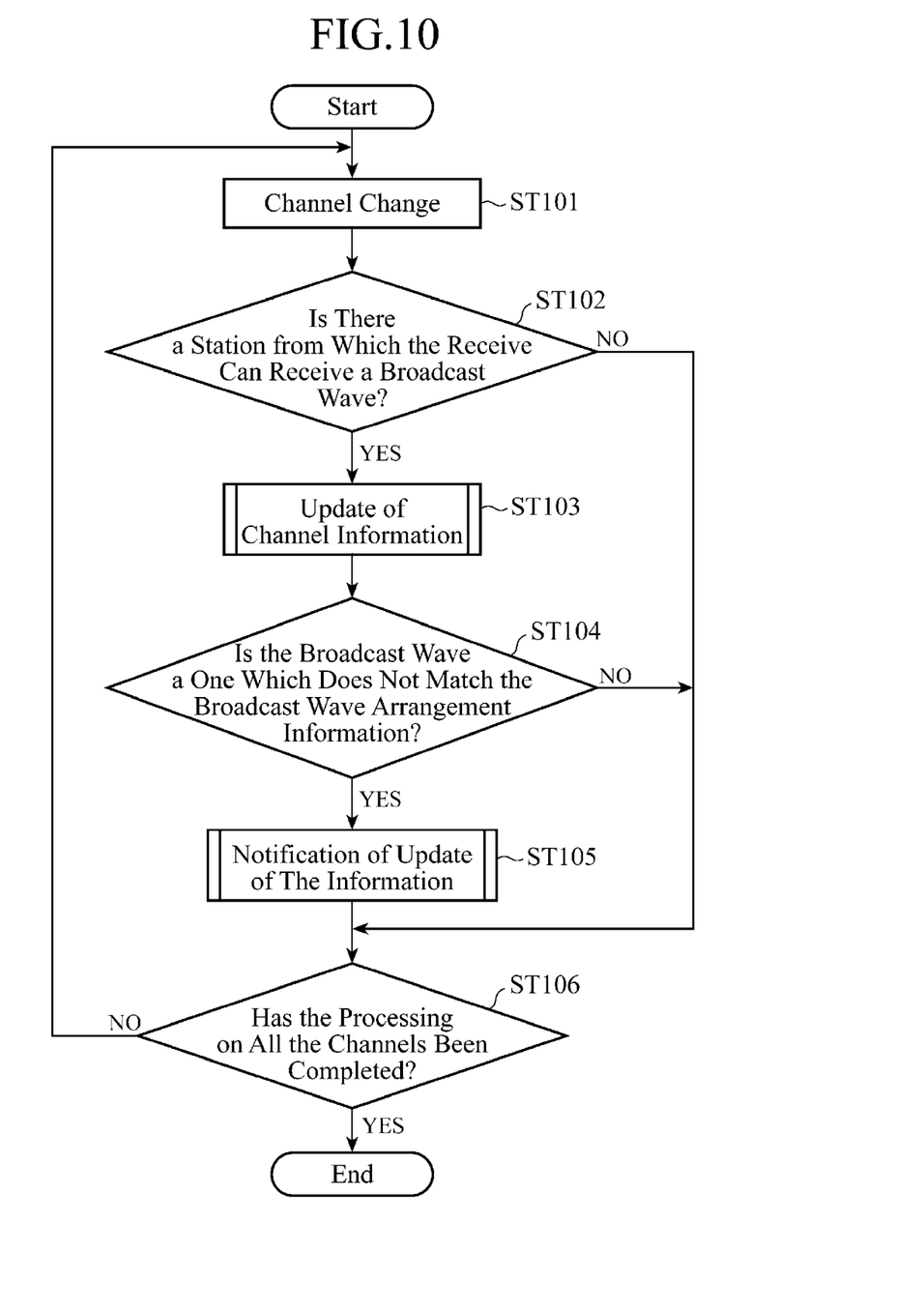
FIG. 10 is a flow chart showing the operation of the broadcast wave arrangement detecting unit for use in the receiver in accordance with Embodiment 3 of the present invention.

Referring now to FIG. 10, the scanning control unit 1481 controls a VCO #1 and a VCO #2 which frequency changing circuits 13 and 15 have, and a band separation filter 14 and an OFDM demodulator 16 to change channels properly while acquiring channel information, such as broadcast wave IDs, via an MPEG decoder 17 connected downstream to the OFDM demodulator 16 (step ST101), and scans an entire broadcast band to determine whether there is a station from which the receiver can receive a broadcast wave.

When determining that there is a station from which the receiver can receive a broadcast wave (if "YES" in step ST102), the scanning control unit updates the channel information (step ST103), and then compares the scanning results with the broadcast wave arrangement information currently stored in the channel memory 1482 and, when determining that there is a broadcast wave which does not match the broadcast wave arrangement information (if "YES" in step ST104), informs broadcast wave arrangement change information to the table update control unit 149 (step ST105). The scanning control unit repeatedly carries out the above-mentioned operation throughout the entire broadcast band (step ST106). If "NO" in step ST102 or ST104, the scanning control unit makes a transition to step ST106.

On the other hand, there is a case in which, when the broadcast wave arrangement is changed, the broadcast wave is transmitted with the change information being piggy-backed onto the broadcast wave. In this case, the scanning control unit acquires the change information from the MPEG decoder 17, and compares this change information with the channel arrangement currently stored in the channel memory 1482 to update the channel arrangement. As an alternative, a user can record the channel arrangement information which the user has acquired from the Internet or the like into a removable memory 200 or the like to update the channel arrangement by connecting the removable memory 200 to the receiver.

Because the receiver in accordance with above-mentioned Embodiment 3 has the mechanism of being able to update the coefficient table 145 by using the broadcast wave arrangement detecting unit 148 for detecting the broadcast wave arrangement to update the broadcast wave arrangement information successively, and the table update control unit 149 for updating the contents of the coefficient table 145 according to the broadcast wave arrangement detected by the broadcast wave arrangement detecting unit 148, the receiver can carry-out the filter operation using optimal coefficients when the broadcast wave arrangement changes from its initial state.

Embodiment 4

Figure 11:
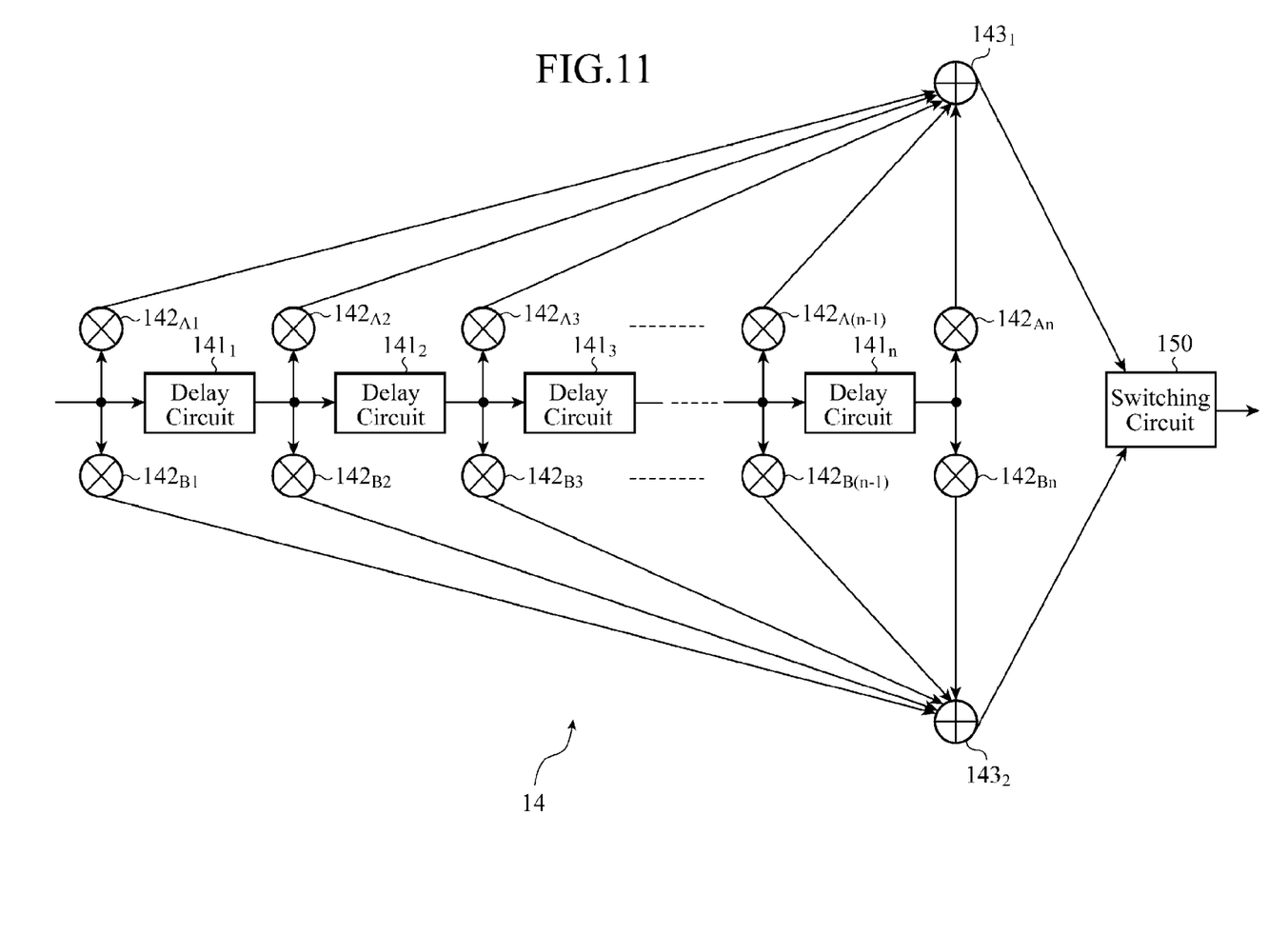
FIG. 11 is a block diagram showing the structure of a band separation filter for use in a receiver in accordance with Embodiment 4 of the present invention.

FIG. 11 is a block diagram showing the structure of a band separation filter 14 for use in a receiver 1 in accordance with Embodiment 4 of the present invention.

In this embodiment, the receiver is provided with a plurality of FIR type filters having different coefficients, which are shown in FIG. 2 as Embodiment 1, and is constructed in such a way as to select one of the plurality of FIR type filters by using a switching circuit 150. As shown in FIG. 11, delay circuits $141_1$ to $141_n$, which can construct one FIR type filter, are shared among the plurality of FIR type filters to reduce the scale of the circuit. Needless to say, delay circuits $141_1$ to $141_n$ can be provided for each of the plurality of FIR type filters.

Because the receiver in accordance with above-mentioned Embodiment 4 has the switching circuit 150 for selecting one of the plurality of FIR type filters having different coefficients, the receiver can easily carry out the filter operation using optimal coefficients. Furthermore, because the delay circuits $141_1$ to $141_n$ which construct the plurality of FIR type filters are shared among the plurality of FIR type filters, the circuit scale can be reduced compared with the case in which delay circuits $141_1$ to $141_n$ are provided for each of the plurality of FIR type filters.

Embodiment 5

Figure 12:
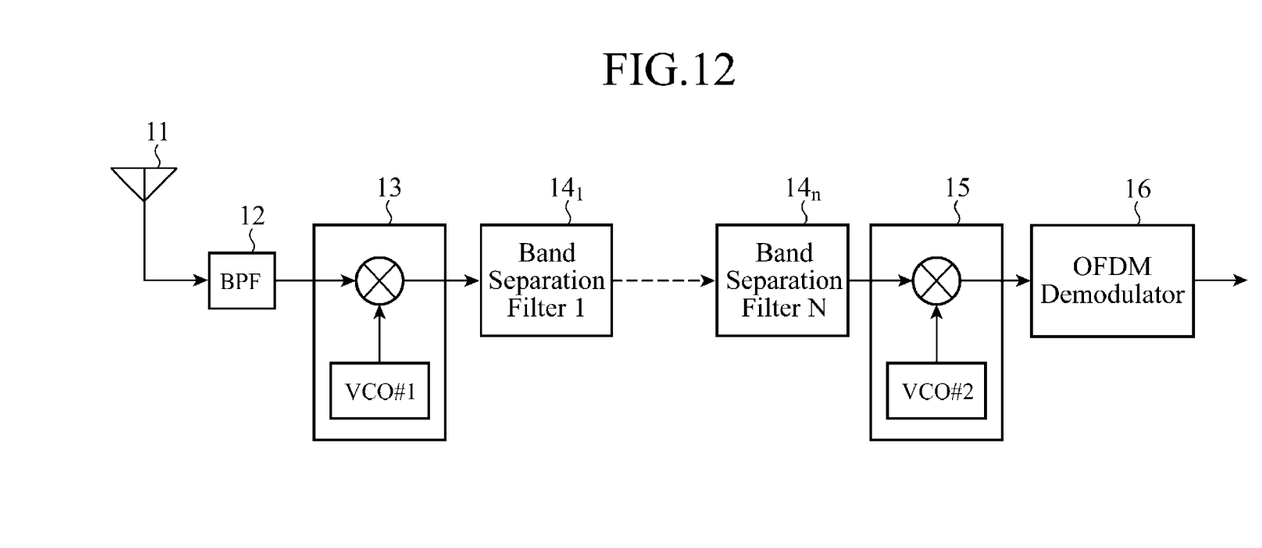
FIG. 12 is a block diagram showing the structure of a band separation filter for use in a receiver in accordance with Embodiment 5 of the present invention.

FIG. 12 is a block diagram showing the structure of a band separation filter 14 for use in a receiver 1 in accordance with Embodiment 5 of the present invention. In this embodiment, a plurality of band separation filters $14_1$ to $14_n$ having different pass bands, each of which is a band separation filter 14 in accordance with Embodiment 1 shown in FIG. 1, are connected in series.

Figure 13:
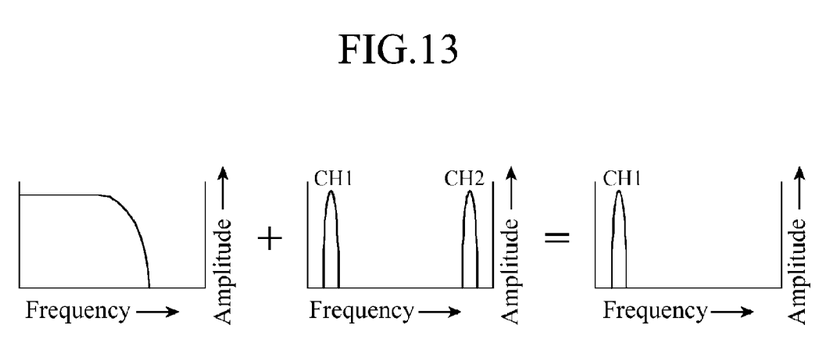
FIG. 13 is an operation conceptual diagram showing the operation of the receiver in accordance with Embodiment 5 of the present invention on the frequency characteristic view.

Because the receiver in accordance with Embodiment 5 of the present invention can block passage of CH2 and further limit the characteristics of the filters, as shown in FIG. 13 schematically showing the operation of the receiver on frequency characteristic views, for example, by connecting in series the two or more FIR type filters for each of which a combination of coefficients providing a different pass band is selected and then carrying out band limiting, the flexibility of the band selected can be improved and more desirable band limiting can be carried out.

INDUSTRIAL APPLICABILITY

Because the receiver in accordance with the present invention makes it possible to carry out multichannel reception with a smaller number of components and can implement further downsizing and cost reduction thereof, the receiver in accordance with the present invention is suitable for use as a receiver capable of receiving multiple channels which simultaneously receives two or more broadcast waves, and so on.

The invention claimed is:

1. A receiver comprising:
    a first frequency changing circuit for converting a received signal including two or more broadcast waves into a first intermediate frequency signal;
    a band separation filter consisting of a multistage FIR type filter for allowing bands included in the two or more broadcast waves converted into said first intermediate frequency signal to pass therethrough simultaneously; and
    a second frequency changing circuit for converting the received signal which is outputted by said band separation filter and which is limited to said two or more broadcast waves which said receiver desires to receive into a second intermediate frequency signal from which each of the broadcast waves can be sampled at a frequency at which the broadcast waves do not interfere with one another when processed by OFDM (Orthogonal Frequency Division Multiplexing) demodulation,
    wherein a delay time provided by delay circuits which construct said FIR type filter is a reciprocal of a frequency which is one-2nth (n is an arbitrary integer) of an entire channel band shown by a difference between a lowest channel of said received signal and a highest channel of said received signal.

2. The receiver according to claim 1, wherein coefficients of coefficient multiplying units which construct said FIR type filter have values selected by referring to a coefficient table in which combinations of some coefficients are stored in advance, or by performing an arithmetic operation, and said receiver includes a broadcast wave arrangement detecting unit for detecting an arrangement of broadcast waves to update broadcast wave arrangement successively, and a table update control unit for updating contents of said coefficient table according to the broadcast wave arrangement detected by said broadcast wave arrangement detecting unit.

3. The receiver according to claim 2, wherein said broadcast wave arrangement detecting unit performs channel scanning to compare a result of the channel scanning with the broadcast wave arrangement which said broadcast wave arrangement detecting unit stores currently and update this the broadcast wave arrangement to a newest broadcast wave arrangement.

4. The receiver according to claim 2, wherein said broadcast wave arrangement detecting unit acquires change information piggybacked onto a broadcast wave or acquires broadcast wave arrangement information from outside said receiver, and compare the change information or the acquired broadcast wave arrangement information with the broadcast wave arrangement which said broadcast wave arrangement detecting unit stores currently and update this the broadcast wave arrangement to a newest broadcast wave arrangement.

5. The receiver according to claim 1, wherein coefficients of coefficient multiplying units which construct said FIR type filter have values selected by referring to a coefficient table in which combinations of some coefficients are stored in advance, or by performing an arithmetic operation, and said receiver includes a switch for selecting a plurality of FIR type filters having different coefficients.

6. The receiver according to claim 5, wherein delay circuits which construct said plurality of FIR type filters are shared among said plurality of FIR type filters.

* * * * *